(12) United States Patent
Kawai et al.

(10) Patent No.: US 6,719,202 B1
(45) Date of Patent: Apr. 13, 2004

(54) COMMODITY INFORMATION MANAGEMENT SYSTEM

(75) Inventors: Hiroaki Kawai, Kanagawa (JP); Isao Iwaguchi, Kanagawa (JP); Mitsuo Watanabe, Kanagawa (JP); Kozo Yamazaki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/282,450

(22) Filed: Mar. 31, 1999

(30) Foreign Application Priority Data

Dec. 8, 1998 (JP) .......................................... 10-349066

(51) Int. Cl.[7] ................................................ G06K 7/10
(52) U.S. Cl. ..................... 235/462.13; 235/383; 705/22; 705/28; 340/572.1
(58) Field of Search .......................... 235/432.13, 375, 235/382, 383, 462.13; 705/16, 21–23, 28–29; 340/571, 572.1, 568

(56) References Cited

U.S. PATENT DOCUMENTS

| 3,836,755 | A | * | 9/1974 | Ehrat ........................... 235/383 |
| 3,938,044 | A | * | 2/1976 | Lichtblau ..................... 325/22 |
| 4,684,930 | A | * | 8/1987 | Minasy et al. ................ 340/551 |
| 5,121,103 | A | * | 6/1992 | Minasy et al. ................ 340/551 |
| 5,410,296 | A | * | 4/1995 | Montbriand et al. ........ 340/572 |
| 5,594,228 | A | * | 1/1997 | Swartz et al. ................ 235/383 |
| 5,635,906 | A | * | 6/1997 | Joseph ........................ 340/572 |
| 5,640,002 | A | * | 6/1997 | Ruppert et al. .............. 235/383 |
| 5,661,292 | A | * | 8/1997 | Knowles et al. ......... 235/462.32 |

FOREIGN PATENT DOCUMENTS

| EP | 0 355 355 | * | 7/1989 |
| EP | 0 333 459 | * | 9/1989 |
| EP | 0 655 355 | * | 2/1990 |
| GB | 2 234 885 | * | 2/1991 |
| JP | 9-128648 |  | 5/1997 |
| WO | 87/04282 | * | 7/1987 |

* cited by examiner

Primary Examiner—Diane I. Lee
(74) Attorney, Agent, or Firm—Armstrong, Kratz, Quintos, Hanson & Brooks, LLP

(57) ABSTRACT

A commodity information management system including a deactivator for deactivating a security tag activated and attached to a commodity after a barcode is read by a reader, a magnetic detector for detecting magnetism of the security tag having been deactivated by the deactivator, and a control section for sending the result of detection by the magnetic detector to an operator with an LED and a speaker. The operator recognizes whether the security of the security tag is released or not according to the light through the LED and sound by the speaker.

4 Claims, 5 Drawing Sheets

PERSPECTIVE VIEW SHOWING EXTERNAL CONFIGURATION OF A POS SYSTEM ACCORDING TO ONE EMBODIMENT

PERSPECTIVE VIEW SHOWING EXTERNAL CONFIGURATION OF A POS SYSTEM ACCORDING TO ONE EMBODIMENT

BLOCK DIAGRAM SCHEMATICALLY SHOWING ELECTRIC CONFIGURATION OF THE POS SYSTEM ACCORDING TO ONE EMBODIMENT

PERSPECTIVE VIEW SHOWING AN EXAMPLE OF MODIFICATION OF THE POS SYSTEM ACCORDING TO ONE EMBODIMENT

BLOCK DIAGRAM SCHEMATICALLY SHOWING ELECTRIC CONFIGURATION OF THE POS SYSTEM BASED ON THE CONVENTIONAL TECHNOLOGY

COMMODITY INFORMATION MANAGEMENT SYSTEM

BACKGROUND OF THE INVENTION

1. Field of the Invention

The present invention relates to a commodity information management system such as a POS (Point Of Sale) system for clearing and performing commodity management by reading a barcode attached to the commodity and, more particularly, to a commodity information management system, which performs security management by using a tag attached to a commodity.

2. Description of the Related Art

In recent years, a POS system which reads a barcode attached to each of the commodities has been installed into different kinds of stores, such as book stores, convenience stores, music software stores, etc., in order to systematize the commodity management, reduce the time for clearing, and save labor or the like. As security measures against, for example, shoplifting, plainclothes watchmen are employed to watch the customers inside the store or the customers are monitored using a video camera. However, it is known that shoplifting cannot be totally prevented even though such measures are taken, and so it may be said that the security is not fool proof.

Under the circumstances as described above, a security measure is currently becoming popular in which security tags, for example, activated tags are attached to each of the commodities in the store and the POS system is provided with a built-in deactivator for deactivating each of the tags at the cash counter. Further, an alarm unit having a magnetic field detector is installed at the exit of the store, and when the alarm unit detects the magnetic field of the tag it considers the case as a shoplifting and provides an alarm.

FIG. 5 is a block diagram schematically showing an electric configuration of a POS system based on conventional technology. In the figure, a commodity 1 on display in a store is taken to the cash counter (not shown in the figure) when a customer wants to buy the commodity. A barcode 2 is attached to the commodity 1 and comprises a plurality of alternately provided black and white bars. This barcode 2 indicates codes such as a commodity maker code and a commodity item code.

A security tag 3 made of magnetic material and having a shape of a thin plate is attached to the commodity 1 in the same manner as that of the barcode 2. This security tag 3 is an activated state while the commodity 1 is on display and is used for the security measure of the store. A scanner 4 is provided in the cash counter and comprises a reading section 5, a control section 6, and an I/F section 7. The reading section 5 optically reads the barcode 2 attached to the commodity 1 to be bought and outputs a result to the control section 6 as barcode data $D_b$, and also outputs a reading-completion signal $S_1$ to the control section 6 when the reading of the barcode 2 is completed.

The control section 6 provides controls for each section of the device and performs processing such as calculating the amount of money to be paid for the commodity 1 according to the barcode data $D_b$, displaying the amount on a display section (not shown), outputting a receipt from a printer (not shown), and outputting the data generated at the time of clearing to a host terminal (not shown) as data related to the commodity from a particular store. The I/F section 7 is an interface between the control section 6 and an external device.

A deactivator 8 is provided near the scanner 4 and comprises a control section 9 and a deactivating section 10. The control section 9 provides controls for driving the deactivating section 10. The deactivating section 10 deactivates the security tag 3 on the same principle as that of an eraser head of a tape recorder when the security tag 3 is brought near it. More specifically, the deactivating section 10 comprises a coil (not shown) and a bias oscillator (not shown) for supplying a high frequency current to the coil, and applies a strong AC magnetic field generated by the coil to the security tag 3. Herein the AC magnetic field is strong enough to activate the security tag 3 to saturation. A alarm unit (not shown) is located at the exit of the store in which this POS system is installed for giving an alarm when it detects the magnetic field of the security tag 3.

Next, the operation of the POS system based on the conventional technology is described. When a customer brings a desired commodity 1 to the cash counter, an operator (or a cashier) swings the commodity 1 from the reading section 5 (upstream side) to the deactivating section 10 (downstream side) to clear the commodity. During this swing, when the barcode 2 comes near the reading section 5 it is optically read by the reading section 5 and barcode data $D_b$ indicating codes, such as a commodity item code, is outputted to the control section 6.

At this time, the deactivating section 10 is driven by the control section 9. When the security tag 3 comes near the deactivating section 10, the AC magnetic field generated by the deactivating section 10 is applied to the security tag 3. Because of this AC magnetic field the magnetic field of the security tag 3 converges to zero after reaching a saturation point on the hysteresis for the tag and the security tag 3 is deactivated. Herein, the state where the security tag 3 is deactivated is referred to as a state where the security is released.

When payment is completed, commodity 1 with the security tag 3 whose security has been released is handed over to the customer, and then the customer goes out of the store through the exit. The alarm unit located at the exit does not issue any alarm because it can not detect the magnetic field of the security tag 3. Namely, this customer is considered as an ordinary customer who has paid for the commodity 1.

In order to explain an example of a case where a commodity 1 is shoplifted, when a shoplifter having the commodity 1 with the security tag 3 which is not deactivated tries to pass through the exit along with the commodity, the alarm unit detects the magnetic field of the security tag 3. Herein, a state where the security tag 3 is not deactivated is referred to as a state where the security is not released. When the alarm unit detects the magnetic field of the security tag 3 it considers that a shoplifter is about to go out of the store and gives an alarm.

In the conventional type of POS system, the security is released by deactivating the security tag 3 with the deactivating section 10, but the operator has no way of understanding whether the security is perfectly released or not because it is impossible to visually check the deactivated state of the security tag 3. Under such circumstances, in the conventional type of POS system, if there is a little more distance between the deactivating section 10 and the security tag 3 when the security tag 3 is passed over deactivating section 10, the AC magnetic field generated by the deactivating section 10 cannot deactivate the magnetic field of the security tag 3.

In such a case the security tag 3 is still activated, commodity 1 with the security tag 3 whose security has not been released is handed over to the ordinary customer who has paid for it. When this customer is about to pass through the exit of the store, the alarm unit located at the exit detects the magnetic field of the security tag 3, the customer is regarded as a shoplifter despite the fact that the customer has paid for it, and an alarm is given which makes the ordinary customer feel displeased.

Accordingly, in the conventional type of POS system, when the case described above occurs, the commodity 1 and the security cannot be managed for a while and the quality of commodity management as well as of security management is degraded.

Also, when the case as described above happens, the ordinary customer regarded as a shoplifter has to go all the way back to the cash counter and tell that payment has been properly made to the operator, and then hand over the commodity 1 again to the operator to have him (her) execute the processing for deactivating the security tag 3 with the deactivating section 10.

However, when the operation for deactivation is performed a second time, the commodity 1 is also passed near the reader 5 and it may happen that the barcode 2 having already been read is read again by the reading section 5. Accordingly, in the conventional type of POS system, the reading section 5 reads the same barcode twice, which lowers the efficiency of the system.

SUMMARY OF THE INVENTION

It is an object of the present invention to provide, for the purpose of solving the problems under the circumstances as described above, a commodity information management system which can surely release the security, improve the quality of commodity management as well as security management, and enhance system efficiency.

In accordance with the invention, at a cash counter, a commodity with a barcode and a tag attached thereto is moved from the upstream side to the downstream side along a path defined by reader→deactivator→detector. During this movement, when the commodity passes near the reader the barcode is read by the reader, further when the commodity passes near the deactivator the tag is deactivated by the deactivator. In other words, the tag is deactivated by the deactivator and the security is released.

Further, when the commodity is positioned near the detector, the detector detects the magnetic field of the tag. The result of detection includes two types: a result that the tag is completely deactivated and a result that the tag is still activated.

Herein, the situation that the tag is still activated may occur under the circumstances that the distance between the tag and the deactivator is too great to deactivate the tag completely by the deactivator, or under the circumstances that the detector may detect an external magnetic field from some other source.

A notifying unit notifies the result of detection by the detector to an operator. Thus, the operator recognizes, when the result of detection is that the tag has completely been deactivated, that the security has been released, and ends the accounting of the commodity.

On the other hand, when the result of detection result is that the tag is still activated, the operator moves the commodity from the deactivator to the detector once again. With this operation, the tag is completely deactivated by the deactivator and the detector detects that the tag is deactivated, and then the operator ends the accounting of the commodity.

When the detector detects an external magnetism although the tag has been deactivated, the fact that tag has been completely deactivated is accurately detected by the detector, so that the operator ends the accounting of the commodity.

As described above, with the invention, a detector for detecting magnetism of a tag is provided therein, and further a notifying unit for notifying an operator of the result of detection by the detector is provided therein, so that release of the security can surely be carried out, which allows the quality of commodity management as well as of security management to be improved.

In accordance with the invention, when magnetism of a tag is detected by a detector, a notifying unit lights up, when a detection result is that the tag is not deactivated, for example, a light-emitting diode or the like. With this feature, an operator is notified of the result of detection by the detector using light.

Then, the operator visually recognizes the result of detection from the lit-up state, and either ends the accounting or moves the commodity from the deactivator to the detector once again according to this detection result.

As described above, with the present invention, the operator is notified of the result of detection using light as a medium by a notifying unit, so that, even if the operator's concentration has been lowered, attention to the result can be called by the light, which allows misoperation to be prevented. Therefore, the security release can surely be carried out.

In accordance with the invention, when a detector detects the magnetism of a tag, a notifying unit outputs a continuous sound from a speaker or the like. Thus, the operator is notified of the result of detection by the detector using sound.

When, the operator hears the result of detection from the sound, either ends the accounting or moves the commodity from the deactivator to the detector once again base on this result of detection.

As described above, with the present invention, an operator is notified of the result of detection using sound as a medium by a notifying unit, so that, even if the operator is looking aside, attention to the result can be called by the sound, which allows misoperation to be prevented. Therefore, the security release can further surely be carried out.

In accordance with the present invention, when the tag of a commodity is positioned near a detector at the time of clearing, magnetism of the tag is detected by the detector. Then the result of detection by the detector is notified to the operator by a notifying unit, and is also reported to a host terminal by a reporting unit.

With this feature, the host terminal can also ascertain whether the tag is completely deactivated or not, in other words, whether the security is released or not, so that when the security is not released, an operator of the host terminal can send a notice to the operator who is carrying out the clearing to the effect that checking deactivation of the tag should be retried.

Namely, the operator who is carrying out the clearing is notified of the result by the notifying unit as well as by the operator of the host terminal, so that the operator will never fail to check the security release.

As described above, with the invention, the security release can most surely be carried out, which allows the quality of commodity management as well as of security management to be significantly improved.

In accordance with the invention, when the tag of a commodity is positioned near a detector at the time of clearing, the magnetic field of the tag is detected by the detector, and the result of detection is notified to an operator by a notifying unit, and is also outputted as electronic document data such as character data or numerical data to a host terminal by a reporting unit.

With this feature, the host terminal recognizes, according to the electronic document data, the result of detection and also stores the electronic document data into a database.

As described above, with the present invention, a result of detection is outputted to the host terminal as electronic document data, so that it is easier to construct a database of results of detection in the host terminal, which allows the quality of security management to be further improved according to this database.

In accordance with the present invention, at a cash counter, a commodity with a barcode and a tag attached thereto is moved from the upstream side to the downstream side along a path defined by reader→deactivator→detector. During this movement, when the commodity passes near the reader the barcode is read by the reader, further when the commodity passes near the deactivator the tag is deactivated by the deactivator. In the final stage, when the commodity passes near the detector the magnetic field of the tag is detected by the detector.

With this feature, a determining unit determines whether or not the tag is deactivated, in other words, whether or not the security is released. Herein, when it is determined that the security is not released (the tag is not deactivated), a control unit first makes a report to the effect that the security is not released to a host terminal.

Then, the host terminal can ascertain that the security is not released, so that an operator of the host terminal sends a notice to the operator who is carrying out the clearing to the effect that checking deactivation of the tag should be repeated.

In addition, the control unit reports to the host terminal and also sends a notice to the effect that a retry of checking the magnetic field of the tag is requested to the operator. The operator once again brings the commodity near the detector, and checks that the security is released according to the second notice from the control unit. Then, the operator ends the clearing of the commodity.

As described above, with the invention, when the security of a tag is not released, a notice to that effect is sent to a host terminal and also a notice to the effect that checking of deactivation of the tag should be retried is sent directly to the operator, so that the security release can more surely be carried out.

In accordance with the invention, when the security of a tag is not released, the control unit enables only the function of the detector during the period of time since the request for a retry of checking deactivation thereof is notified to the operator until the determining unit determines that the tag is deactivated.

Therefore, even if the operator brings the commodity near the reader and the detector, the barcode is not possibly read again by the reader and only the magnetic field of the tag is detected again by the detector.

As described above, with the present invention, only the function of the detector is enabled, so that a wasteful operation of reading of the barcode twice during the operation of retry can be omitted, which allows the system efficiency to be enhanced.

In accordance with the present invention, when a barcode is read by a barcode reader, a deactivating section-drive signal is outputted from an output unit, and a tag is deactivated through driving of the deactivating section. Then, the deactivating section is driven, and when magnetism of the tag is detected by the magnetic detector, a notice is sent to an operator by a notifying unit.

As described above, with the present invention, when the magnetic field of the tag is still detected after the deactivating section is driven, namely when the security of the tag is not released, a notice to that effect is sent to the operator by a notifying unit, so that the notifying unit can inform the operator to release the security with the tag, which allows the security release to surely be carried out.

Other objects and features of this invention will become apparent from the following description with reference to the accompanying drawings.

DESCRIPTION OF THE PREFERRED EMBODIMENTS

Detailed description is made hereinafter assuming a POS system as an example of one embodiment of the commodity information management system according to the present invention with reference to the related drawings.

Figure 1:
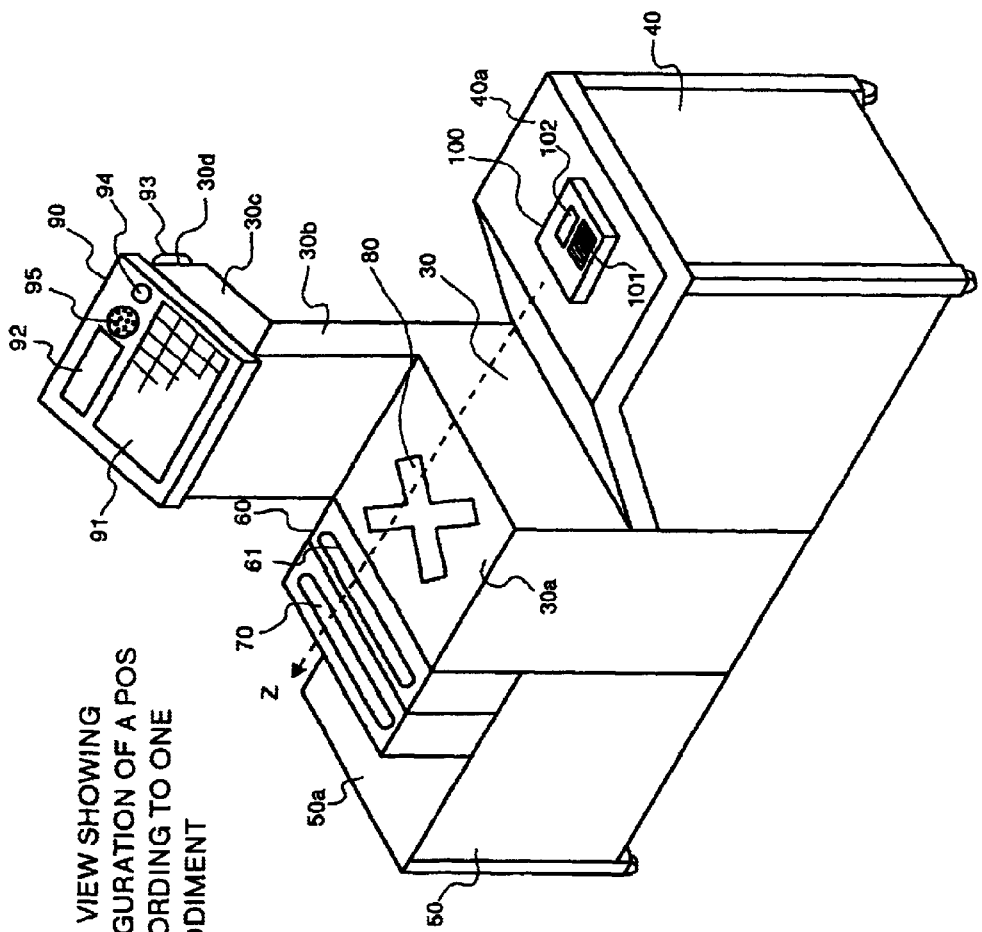
FIG. 1 is a perspective view showing external configuration of a POS system according to one embodiment of the present invention.

FIG. 1 is a perspective view showing an external configuration of the POS system according to a first embodiment of the present invention. In the figure, a main body 30 has a vertical member 30b extending in a vertical direction along one of the side faces thereof and a mounting member 30c extending in a slanting direction from the edge of the vertical member 30b. Herein, an operator (a cashier) stands and works (service) facing towards the main body 30 in the figure.

An upstream counter 40 is provided in the upstream side, namely, in the right side of the main body 30 in the figure, and the surface thereof is a table surface 40a. A commodity 100 to be purchased is placed on this table surface 40a.

Figure 5:
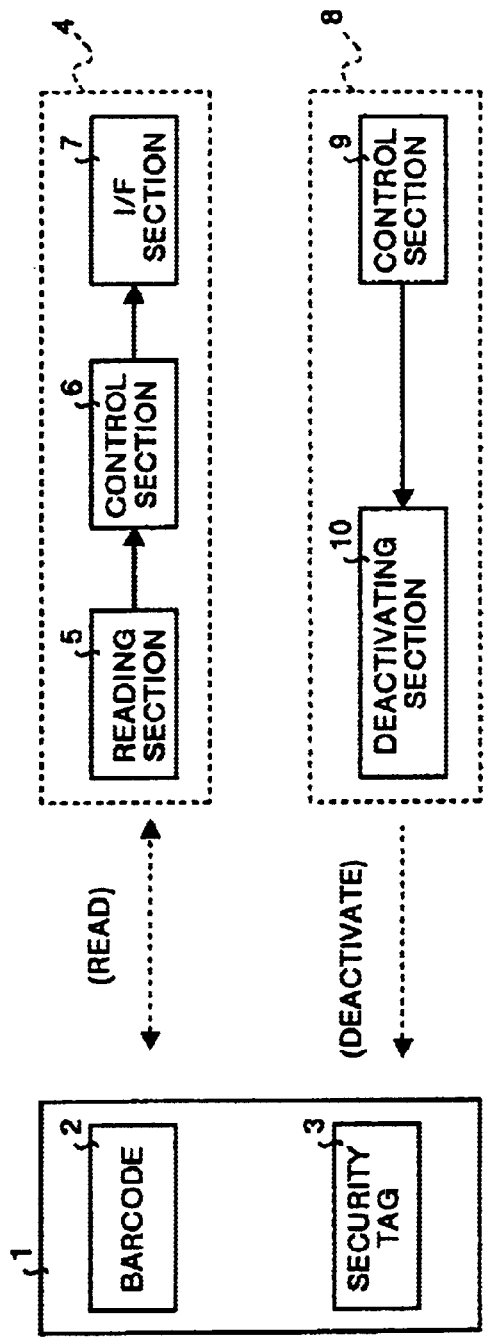
FIG. 5 is a block diagram schematically showing the electric configuration of the POS system based on the conventional technology.

Attached to the commodity 100 are a barcode 101 and a security tag 102 having the same configuration as that of the barcode 2 and security tag 3 (Refer to FIG. 5) as described above. Namely, the barcode 101 indicates, as described above, codes such as a commodity maker code and a commodity item code for the commodity 100. While the security tag 102 is used for a security measure in a store and is made of a magnetic material formed in a thin plate, and is in a activated state when the commodity 100 is being displayed.

A downstream counter 50 is provided in the downstream side, namely, in the left side of the main body 30 in the figure, and a commodity 100 whose barcode has been read is placed on a table surface 50a of the counter. A deactivator 60 is provided on the table surface 50a in the downstream side from a reading section 80 described later and deactivates the security tag 102 attached to the commodity 100. This deactivator 60 has a deactivating section 61 having the same configuration as that of the deactivating section 10 (Refer to FIG. 5) described above.

A magnetic detector 70 is provided on the table surface 50a in the downstream side from the deactivator 60, and detects the magnetic field of the security tag 102 attached to the commodity 100. The reading section 80 is provided on a scanner surface 30a of the main body 30 and optically reads the barcode 101 attached to the commodity 100. More specifically, the reading section 80 comprises a laser oscillator (not shown) for irradiating laser beam onto the barcode 101 and a beam-receiving section (not shown) for receiving the laser beam reflected by the barcode 101 and outputting the barcode data $D_b$ (Refer to FIG. 2) according to the distribution of black and white bars on the barcode 101.

As described above, the reading section 80, deactivator 60, and the magnetism detector 70 are provided along the upstream side to the downstream side, respectively.

A control panel 90 which is operated by the operator is mounted on the mounting member 30c. A keyboard 91 provided on the control panel 90 has ten-keys for entry of the amount of money or the like. A display 92 for the operator is provided in the upper side of the keyboard 91 on the control panel 90, and data such as the name and the price of the commodity is displayed to the operator.

A LED (Light Emitting Diode) 94 is provided in the upper side of the keyboard 91 on the control panel 90 and gives a notice with light of the result of detection or of a request for a retry of checking deactivation by the magnetic detector 70 described later to the operator. A speaker 95 is provided near the LED 94 on the control panel 90 and gives a notice with sound of the result of detection or of a request for the retry by the magnetic detector 70 to the operator. A display 93 for the customer is mounted on the side facing the customer and displays data such as name and price of the commodity to the customer.

Figure 2:
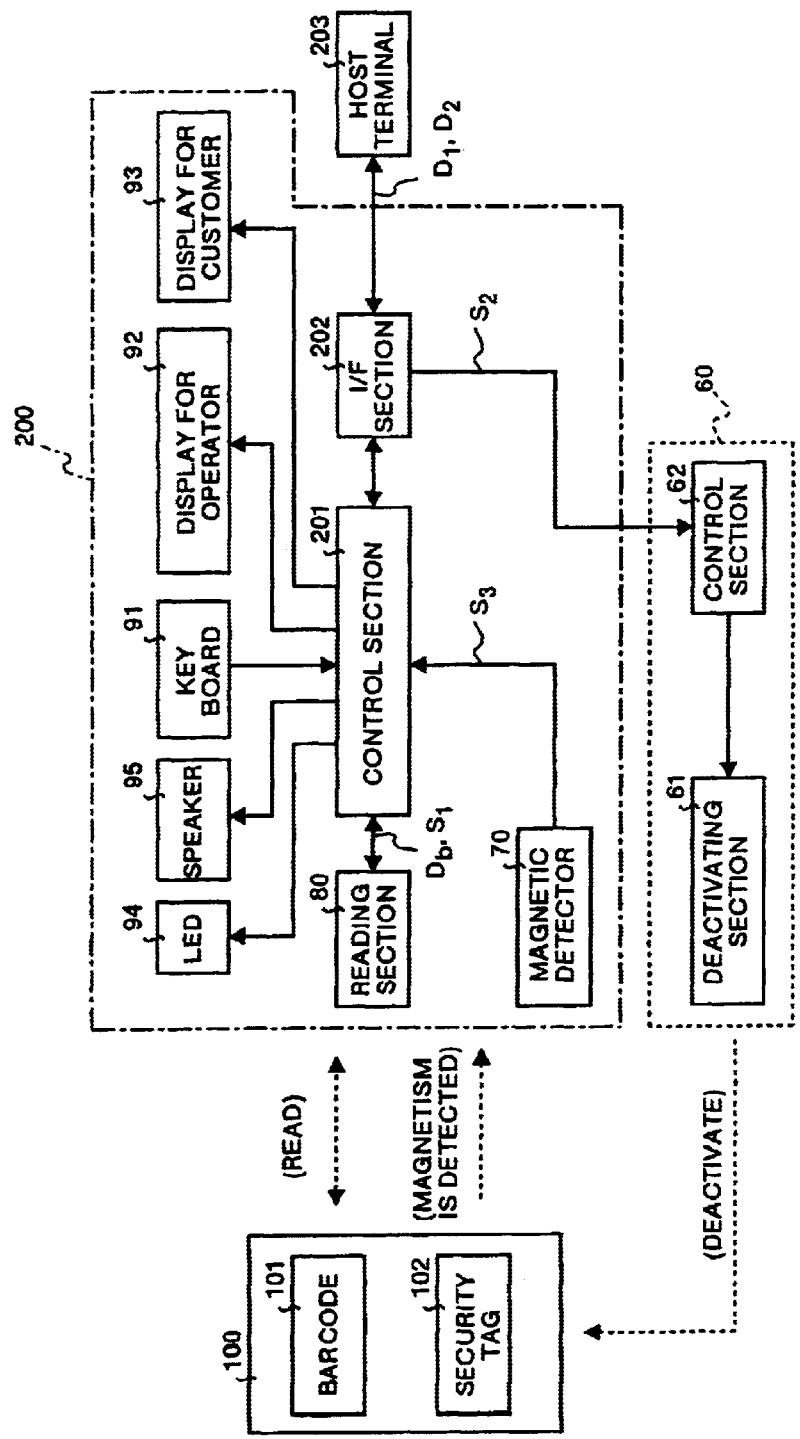
FIG. 2 is a block diagram schematically showing the electric configuration of the POS system according to the same embodiment.

FIG. 2 is a block diagram showing the electric configuration of the POS system according to the first embodiment. In the figure, the same reference numerals are assigned to the sections corresponding to those in FIG. 1.

In FIG. 2, a barcode reader 200 comprises the magnetic detector 70, reading section 80, keyboard 91, display 92 for the operator, display 93 for the customer, LED 94, speaker 95, a control section 201, and an I/F section 202.

The magnetic detector 70 (Refer to FIG. 1) detects the magnetic field of a security tag 102 and outputs a result of detection to the control section 201 as a magnetism-detection result signal $S_3$. Herein, the result of detection includes two types of results: a result that the security tag 102 is deactivated and a result that the security tag 102 is not deactivated.

The reading section 80 optically reads the barcode 101 attached to the commodity 100 to be summed for payment and outputs the result to the control section 201 as barcode data $D_b$, and also outputs a reading-completion signal $S_1$ to the control section 201 when the reading is completed.

The control section 201 provides controls for each section of the device and performs processing such as calculating the amount of money to be received for the commodity 100 according to the barcode data $D_b$, displaying the amount of money for the commodity 100 or the like on the display 92 for an operator as well as on the display 93 for a customer. The control section 201 outputs, in addition to the processing, a deactivating-section drive signal $S_2$ to a control section 62 through the I/F section 202 after receiving the reading-completion signal $S_1$. Herein, the deactivating-section drive signal $S_2$ is a signal indicating that the deactivating section 61 should be driven.

The control section 201 determines whether the security tag 102 is deactivated or not, in other words, whether or not the security with the security tag 102 is released according to a magnetism-detection result signal $S_3$ received from the magnetic detector 70. Further, the control section 201 is connected to a host terminal 203 for controlling the entire system through the I/F section 202, and outputs data $D_1$ for release of security or data $D_2$ for inhibition of security release to the host terminal 203 according to the determination.

Herein, the data $D_1$ for release of security is a signal indicating that the security with the security tag 102 is released, while the data $D_2$ for non-release of security is a signal indicating that the security with the security tag 102 is not released.

The deactivator 60 (Refer to FIG. 1) comprises the deactivating section 61 and control section 62. The control section 62 provides controls for driving the deactivating section 61 when it receives a deactivating-section drive signal $S_2$ from the control section 201 through the I/F section 202. The deactivating section 61 deactivates the security tag 102 when it is positioned adjacent thereto by generating an AC magnetic field based on the same principle as that of an eraser head for a tape recorder in the same manner as that of the deactivator 10 (Refer to FIG. 5).

An alarm unit (not shown) for issuing an alarm when the magnetic field of the security tag 102 is detected is located at the exit of the store in which this POS system is installed.

Next, a description will be made for the operation of the POS system of the first embodiment by referring to the flow chart shown in FIG. 3. In FIG. 2, when power is supplied to each section, the control section 201 shifts the processing to step S1 shown in FIG. 3, the reading section 80 is driven therein, and shifts the processing to step S2. This processing puts the reading section 80 in a state where it can read the barcode 101 attached to a commodity 100. At this point of time it is assumed that the commodity 100 (the barcode 101 and security tag 102) is not positioned near the reading section 80 and the magnetism detector 70.

In step S2, the control section 201 determines whether a reading-completion signal $S_1$ is received from the reading section 80 or not. In this case, since the barcode 101 is not positioned near the reading section 80, the reading section 80 does not perform a reading operation, hence, a reading-completion signal $S_1$ is not outputted from the reading section 80. Accordingly, the control section 201 regards a determination result in step $S_2$ as "NO", and repeats the same determination.

When a customer puts the commodity 100 on the table surface 40a shown in FIG. 1, the operator swings the commodity 100 in the direction indicated by the arrow Z, namely, from the upstream side to the downstream side in a state where the commodity 101 is upside down, namely in a state where the barcode 101 and security tag 102 are facing towards the reading section 80, deactivating section 61 and to the magnetic detector 70.

During this swing, when the barcode 101 passes near the reading section 80 the barcode 101 is optically read by the reading section 80 and barcode data $D_b$ is successively outputted from the reading section 80 shown in FIG. 2 to the control section 201. When reading of the barcode 101 is completed, the reading section 80 outputs a reading-completion signal $S_1$ to the control section 201.

The control section 201 at first recognizes the name and the price of the commodity 100 according to the barcode data $D_b$, and then displays the data on the display 92 for an operator and the display 93 for a customer. Because a reading-completion signal $S_1$ is received, the control section 201 regards a determination result in step S2 as "YES", and shifts the processing to step S3.

In step S3, the control section 201 outputs a deactivating-section drive signal $S_2$ to the control section 62 of the deactivator 60 through the I/F section 202, and shifts the processing to step S4. With this processing, the deactivating section 61 is driven under the control by the control unit 62, so that the magnetic field of the security tag 102 can be detected. When the security tag 102 passes near the deactivating section 61, the AC magnetic field generated by the deactivating section 61 is applied to the security tag 102. The magnetic field of the security tag 102 converges to zero after reaching a saturation point on the hysteresis loop for the tag and thus the security tag 102 is completely deactivated.

In step S4, the control section 201 determines whether a magnetism-detection result signal $S_3$ is received from the magnetic detector 70 or not. In this case, the magnetism-detection result signal $S_3$ is not received so that the control section regards a result of determination as "NO" and repeats the same determination.

When the security tag 102 passes near the magnetic detector 70, the magnetic detector 70 detects magnetic field of the security tag 102. In this case, as the security tag 102 is completely deactivated so that the magnetic detector 70 outputs a magnetism-detection result signal $S_3$ indicating that the security tag is deactivated, namely, that the security with the security tag 102 is released to the control unit 201.

With this processing, the control unit 201 regards the result of determination in step S4 as "YES" and shifts the processing to step S5. In step S5, the control unit 201 determines whether or not the security with the security tag 102 is released according to the magnetism-detection result signal $S_3$. In this case, the security has been released so that the control section regards a determination result as "YES" and shifts the processing to step S6.

In step S6, the control unit 201 sends a notice to the operator indicating that the security has been released, and shifts the processing to step S7. More specifically, the control unit 201 provides controls for lighting up the LED 94 and also controls for driving the speaker 95. Thus, the LED 94 is lit up and an alarm is given from the speaker 94 so that the operator recognizes that the security with the security tag 102 has been released, ends the clearing and hands over the commodity 100 to the customer.

In step S7, the control unit 201 outputs data $D_1$ for release of security indicating that the security has been released to the host terminal 203 through the I/F section 202, returns the processing to step S1, and repeats the processes described above until the power supply is stopped. Herein, the data $D_1$ for release of security is electronic document data such as character data and numerical data. The host terminal 203 ascertains a detection result by the magnetism detector 70 from the data $D_1$ for release of security, and also puts the data $D_1$ for release of security into a database.

On the other hand, when the security tag 102 passes near the deactivating section 61 and the AC magnetic field generated from the deactivating section 61 is applied to the security tag 102, and if the distance between the security tag 102 and the deactivating section 61 is too long the magnetic field of the security tag 102 does not reach the saturation point, so that deactivation is not completely performed, which is regarded as a state where the security tag 102 is still activated.

When the security tag 102 passes near the magnetic detector 70 in the state where the security tag 102 is still activated as described above, the magnetism-detection result signal $S_1$ indicating that the magnetism of the security tag 102 has been detected is received from the magnetic detector 70 to the control unit 201. As another example, when the security tag 102 passes near the magnetic detector 70 in the state where the security tag 102 has been deactivated, and if an external magnetic field from some other source is detected by the magnetic detector 70, the control unit 201 also receives the magnetism-detection result signal $S_3$ indicating that the magnetism of the security tag 102 has been detected.

In such a case, in step S5, the control section 201 determines that the security with the security tag 102 is not released, and regards the result of determination as "NO" and shifts the processing to step S8.

In step S8, the control unit 201 sends a notice to the operator requesting him for a retry of checking the deactivation and shifts the processing to step S9. More specifically, the control unit 201 provides controls for intermittently lighting up the LED 94, and also controls for driving the speaker 95 on an intermittent base. With those operations, the LED 94 is intermittently lit up and an intermittent sound is made from the speaker 94, and the operator recognizes that the security with the security tag 102 is not released through the light and sound, so that the operator recognizes that a retry of checking deactivation thereof is required.

In step S9, the control unit 201 enables, among functions of the reader 80 and magnetic detector 70, only the function of the magnetic detector 70 by disabling the reading section 80, and shifts the processing to step S10.

In step S10, the control unit 201 outputs data $D_2$ for non-release of security indicating that the security has not been released to the host terminal 203 through the I/F section 202, returns the processing to step S4, and determines whether or not the data $D_2$ for non-release of security is received. Herein, the data $D_2$ for non-release of security is electronic document data such as character data and numerical data.

The host terminal 203 ascertains the result of detection by the magnetism detector 70 from the data $D_2$ for non-release of security, and also puts the data $D_2$ for non-release of security into the database. The host terminal 203 can also recognize that the security is not released, so that the operator for the host terminal 203 sends a notice to the effect that checking deactivation of the tag should be retried to the operator who is carrying out the clearing.

In the operation of checking deactivation of the tag, the operator positions again the security tag 102 attached to the commodity 100 shown in FIG. 1 near the magnetic detector 70. Herein, even if the security tag 102 attached to the commodity 100 is positioned near the reading section 80, the security tag 102 will never be read twice because the function of the reading section 80 has been disabled.

When the security tag 102 passes near the magnetic detector 70, the magnetic detector 70 detects the magnetic field of the security tag 102 second time. In this case, the magnetic detector 70 outputs a magnetism-detection result signal $S_3$ to the control unit 201 indicating that the security tag is deactivated, namely that the security with the security tag 102 is released. Thus, the operation of checking the deactivation of the tag is successfully performed in the second try.

Therefore, the control unit 201 regards a result of determination in step S4 as "YES" and shifts the processing to step S5, and also regards a result of determination in step S5 as "YES" and shifts the processing to step S6, and then the processes described above are repeated.

Figure 3:
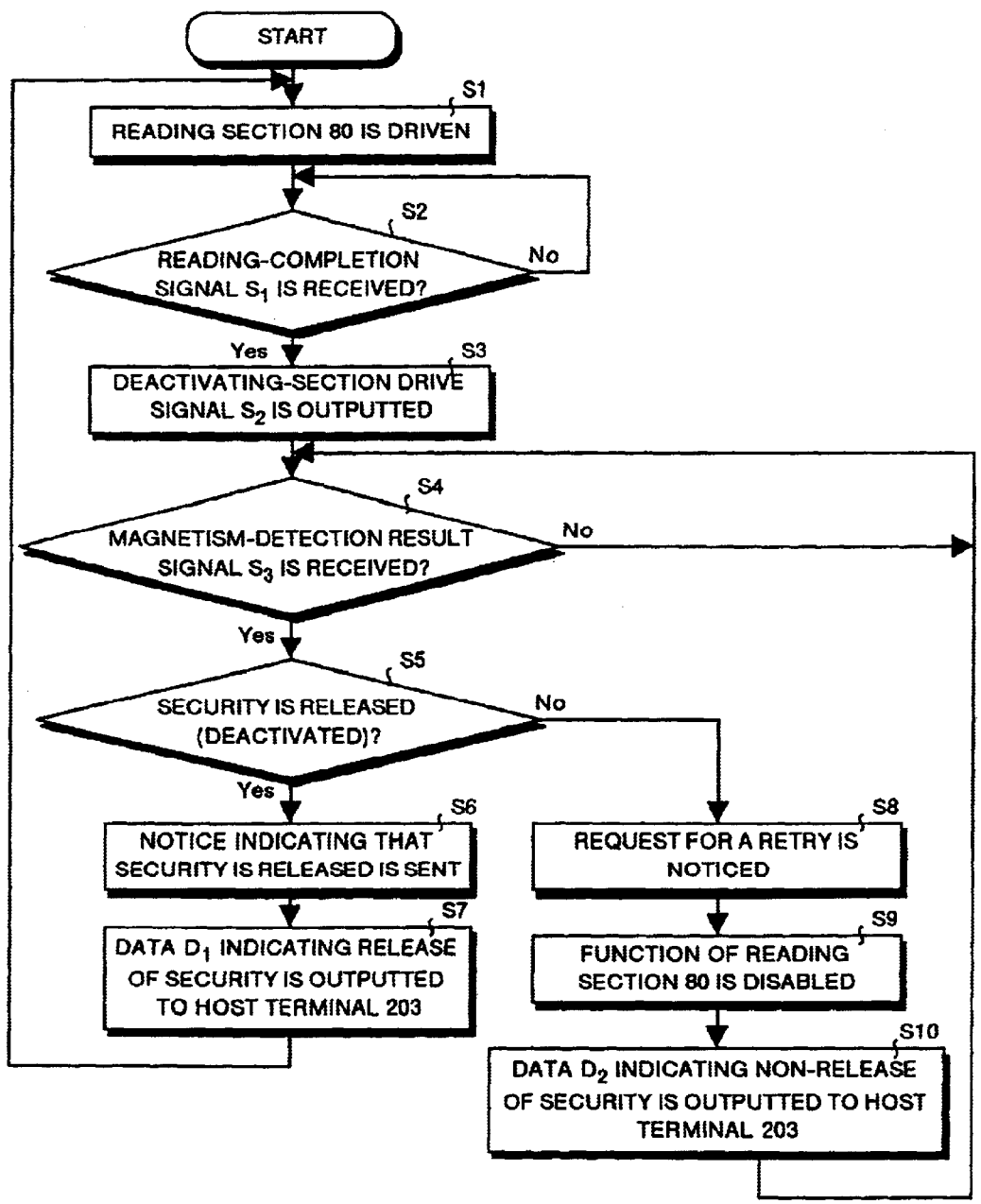
FIG. 3 is a flow chart for explaining the operation of the POS system according to the same embodiment.

In the POS system according to the first embodiment described above, a notice only to the effect that the security is not released may be sent to the operator in place of the request for a retry in step S8 shown in FIG. 3. In this case, the control unit 201 does not activate the LED 94 or the speaker 95. Accordingly, neither the LED 94 is lit up nor the speaker 95 gives an alarm, thus, the operator recognizes that the security with the security tag 102 is not released, and repeats the operation of checking deactivation thereof on her (his) own.

In the POS system according to the first embodiment described above, the processing in step S9 shown in FIG. 3 may be omitted and the processing may be shifted from step S8 to step S10.

As described above, in accordance with the POS system according to the first embodiment, a magnetic detector 70 for detecting the magnetic field of a security tag 102 is provided therein, and further the operator is notified of the result of detection by the magnetic detector 70, so that the security release with the security tag 102 can surely be carried out, which allows the quality of commodity management as well as of security management to be improved.

In accordance with the POS system according to the first embodiment, an operator is notified of the result of detection by the magnetic detector 70 using a light as a medium by the LED 94, so that, even if the operator is not concentrating, his attention can be obtained by the light, which allows misoperation to be prevented. Thus, the security release can more surely be carried out.

In accordance with the POS system according to the first embodiment, an operator is notified of the result of detection by the magnetic detector 70 using sound as a medium by the speaker 95, so that, even if the operator is looking aside, his attention can be obtained by the sound, which allows misoperation to be prevented. Thus, the security release can further surely be carried out.

In accordance with the POS system according to the first embodiment, an operator who is carrying out the accounting is doubly notified of the result by the LED 94 and the speaker 95 as well as by the operator of the host terminal 203, therefore, a case in which the operator fails to check the security release using the security tag 102 can surely be prevented.

Furthermore, in accordance with the POS system according to the first embodiment, the result of detection by the magnetic detector 70 is outputted to the host terminal 203 as data $D_1$ for release of security and data $D_2$ for non-release of security which are electronic document data, so that it is easier to construct a database on the result of detection in the host terminal 203, which allows the quality of security management to further be improved according to this database.

In accordance with the POS system according to the first embodiment, when the security of a security tag 102 is not released, among the reading section 80 and magnetic detector 70, only the function of the magnetic detector 70 is enabled, so that a wasteful operation in which the barcode 101 is read twice at the operation of retry can be omitted, which allows the system efficiency to be enhanced.

In the POS system according to the first embodiment, the description assumes that the barcode 101 and the security tag 102 shown in FIG. 2 are provided separately, but the barcode 101 and the security tag 102 may be integrated by printing the barcode 101 on the surface of the security tag 102.

Figure 4:
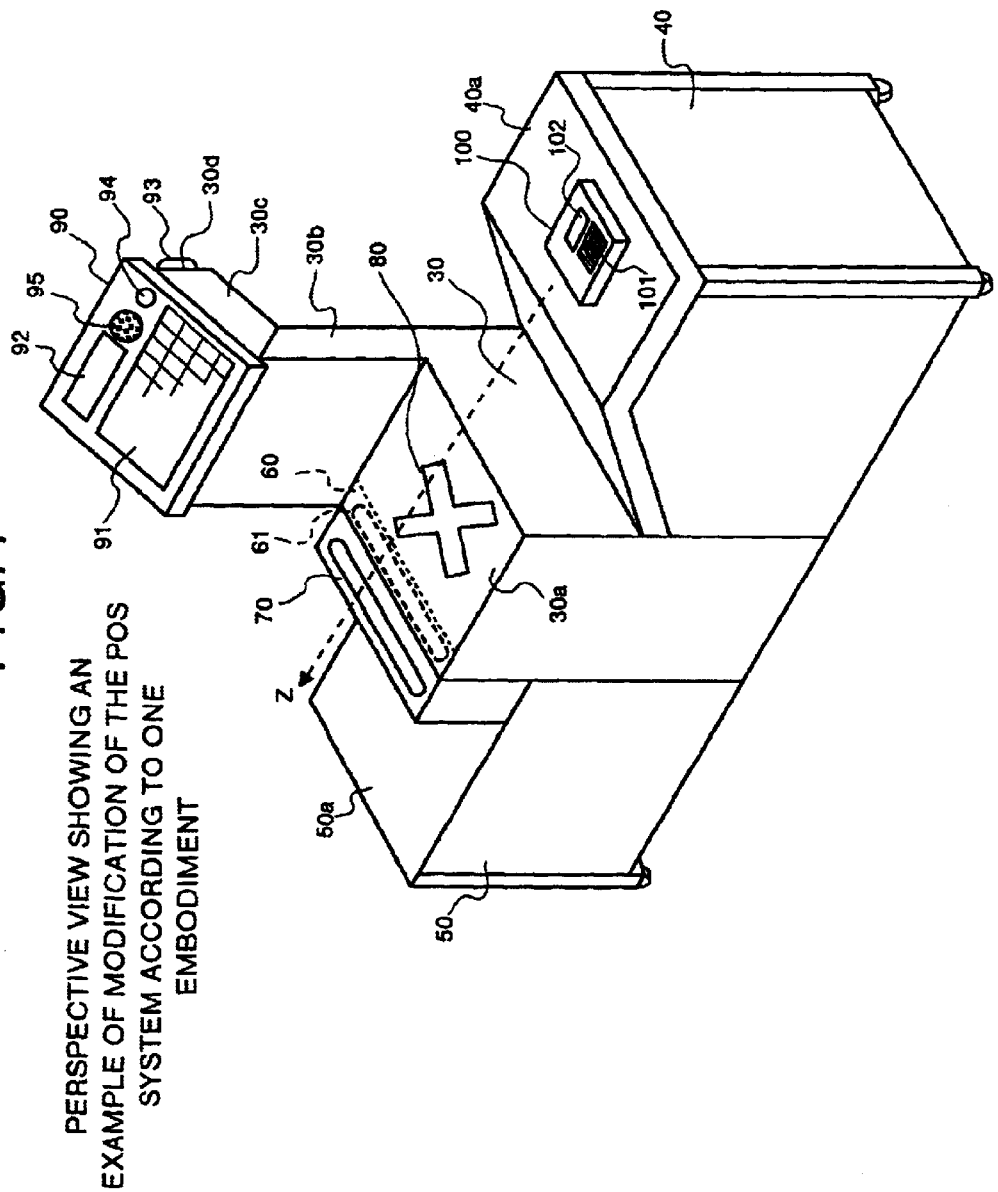
FIG. 4 is a perspective view showing an example of modification of the POS system according to the same embodiment.

Furthermore, in the POS system according to the first embodiment, although the description has assumed that the deactivator 60 and the reading section 80 shown in FIG. 1 are provided separately, the configuration thereof is not limited to the embodiment but may be such, as shown in FIG. 4, that the main body 30 has a built-in deactivator 60 in addition to the reading section 80 so that the system can be down-sized.

Furthermore, in the POS system according to the first embodiment, although the description has assumed that the operator is notified of the result of detection by the magnetic detector 70 using both the LED 94 and the speaker 95 shown in FIG. 2, the operator may be notified of a detection result with either the LED 94 or the speaker 95.

As described above, in accordance with the present invention, a detector for detecting the magnetism of a tag is provided therein, and further a notifying unit for notifying an operator of the result of detection by the detector is provided therein, so that the security release with a tag can surely be carried out, which allows the quality of commodity management as well as of security management to be improved.

In accordance with another embodiment of the present invention, the operator is notified of a detection result using light as a medium by a notifying unit, so that, even if the operator is not concentrating, his attention can be called by the light, which allows misoperation to be prevented and the security release can surely be carried out.

In accordance with another embodiment of the present invention, an operator is notified of the result detection using sound as a medium by a notifying unit, so that, even if the operator is looking aside, his attention can be called using the sound, which allows misoperation to be prevented and the security release can further surely be carried out.

In accordance with another embodiment of the present invention, an operator who is carrying out the clearing is doubly notified of the result by a notifying unit as well as by an operator for a host terminal, hence such a case in which the operator fails to check the security release can surely be prevented. Accordingly, with the above invention, the security release can most surely be carried out, which allows the quality of commodity management as well as of security management to significantly be improved.

In accordance with another embodiment of the present invention, the result of detection is outputted to a host terminal as electronic document data, so that it is easier to construct a database on the result of detection in the host terminal, which allows the quality of security management to further be improved according to this database.

In accordance with another embodiment of the present invention, when the security of a tag is not released, a notice to that effect is sent to a host terminal and also a notice to the effect that checking deactivation of the tag should be retried is sent directly to the operator, so that the security release can more surely be carried out.

In accordance with another embodiment of the present invention, when the security is not released, among a reader and a detector, only the function of the detector is enabled, so that a wasteful operation in which the barcode is read twice during the operation of retry can be omitted, which allows the system efficiency to be enhanced.

In accordance with another embodiment of the present invention, when magnetism of a tag is detected even after a deactivating section is driven, a notice to that effect is sent to the operator by a notifying unit, so that the notifying unit can urge the operator to release the security, which allows the security release to surely be carried out.

This application is based on Japanese patent application No. HEI 10-349066 filed in the Japanese Patent Office on Dec. 8, 1998, the entire contents of which are hereby incorporated by reference.

Although the present invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A commodity information management system for managing commodity as well as security thereof based on a barcode and an activated stage attached to said commodity, said system comprising:

a reader for reading the barcode;

a deactivator provided downstream from said reader for deactivating the tag after the barcode is read by the reader;

a detector provided downstream from and adjacent to said deactivator for detecting magnetism of the tag;

a notifying unit for notifying an operator of a detection result by said detector;

a determining unit for determining whether or not the security tag has been deactivated according to the detection result;

a host terminal for controlling the operation of an entire system; and a control unit for making a report, when said detection result is determined by said determining unit that the tag has not been deactivated, to an effect that the security is not released to the host terminal, and also sending a notice to the effect that a retry of checking deactivation of the tag is requested to the operator, wherein said tag is for assuring that payment for said commodity attached thereon is done, and said control unit enables, among said reader and said detector, only the function of said detector during a period of time since the request of the retry is notified until said determining unit determines that the security tag is deactivated.

2. A commodity information management system according to claim 1, wherein the notifying unit notifies an operator of the detection result with light.

3. A commodity information management system according to claim 1, wherein the notifying unit notifies an operator of the detection result with sound.

4. The commodity information magnet system according to claim 1, wherein said tag is made of magnetic material and has a thin plate shape.

* * * * *